Patented Apr. 17, 1945

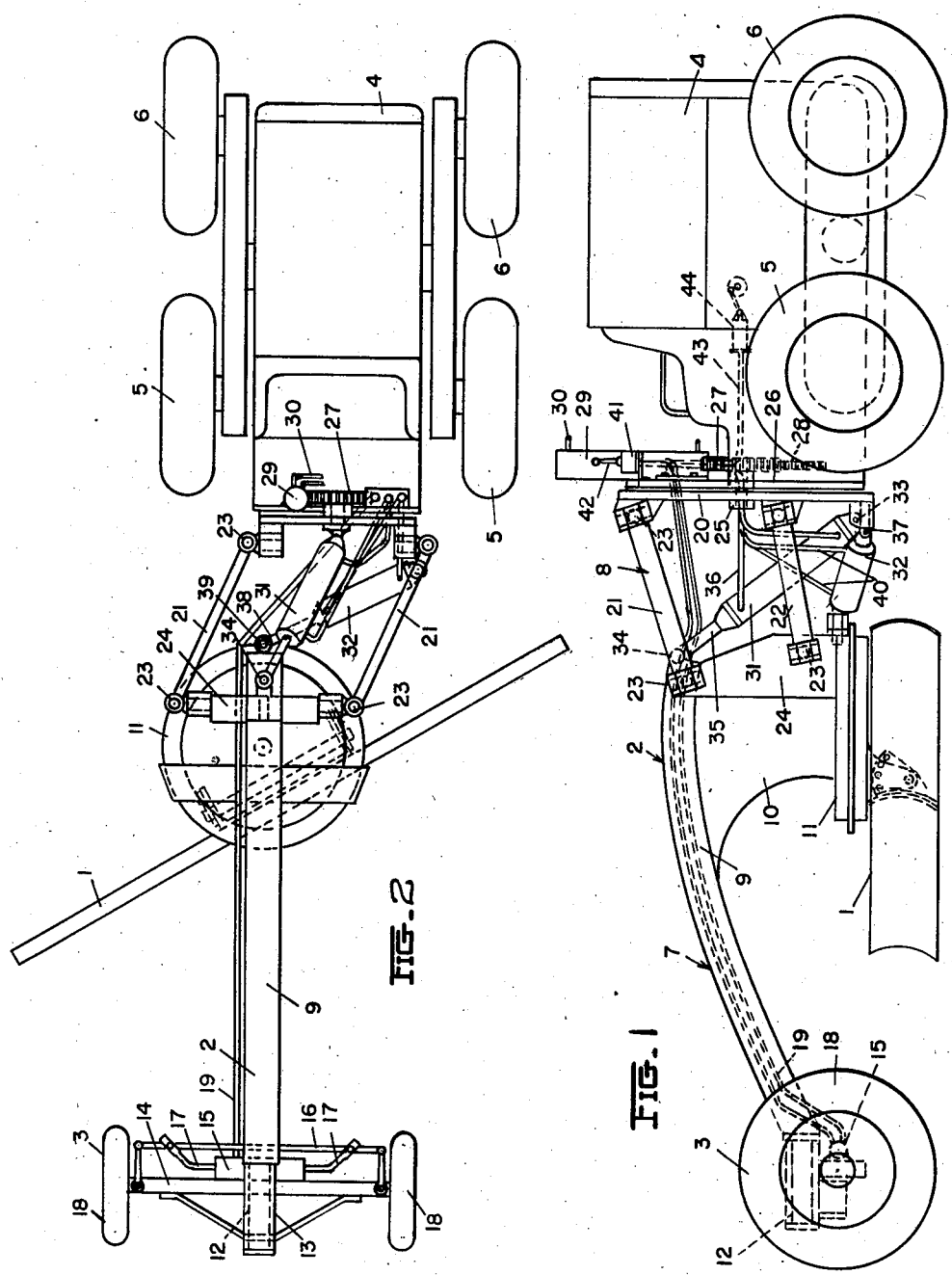

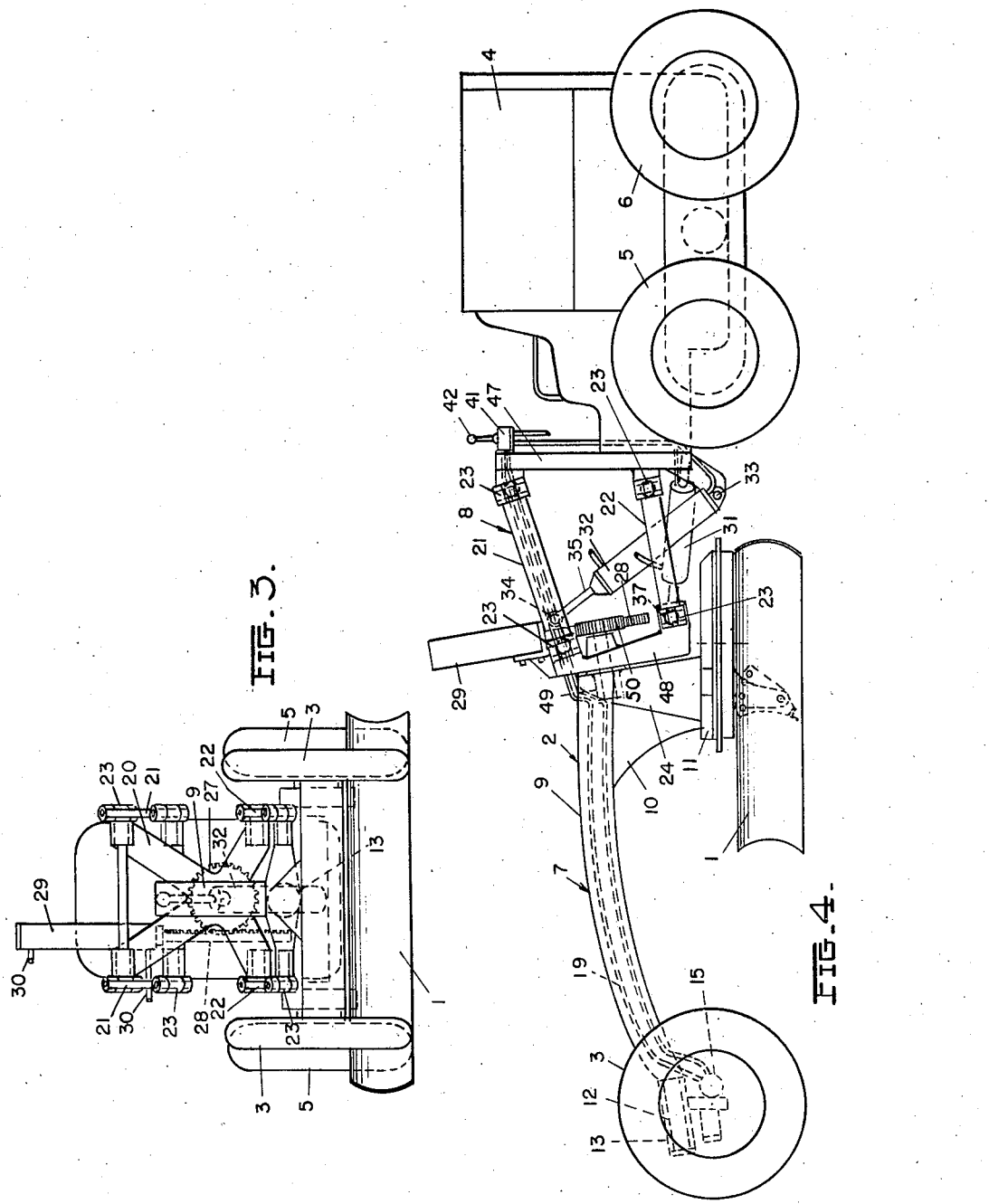

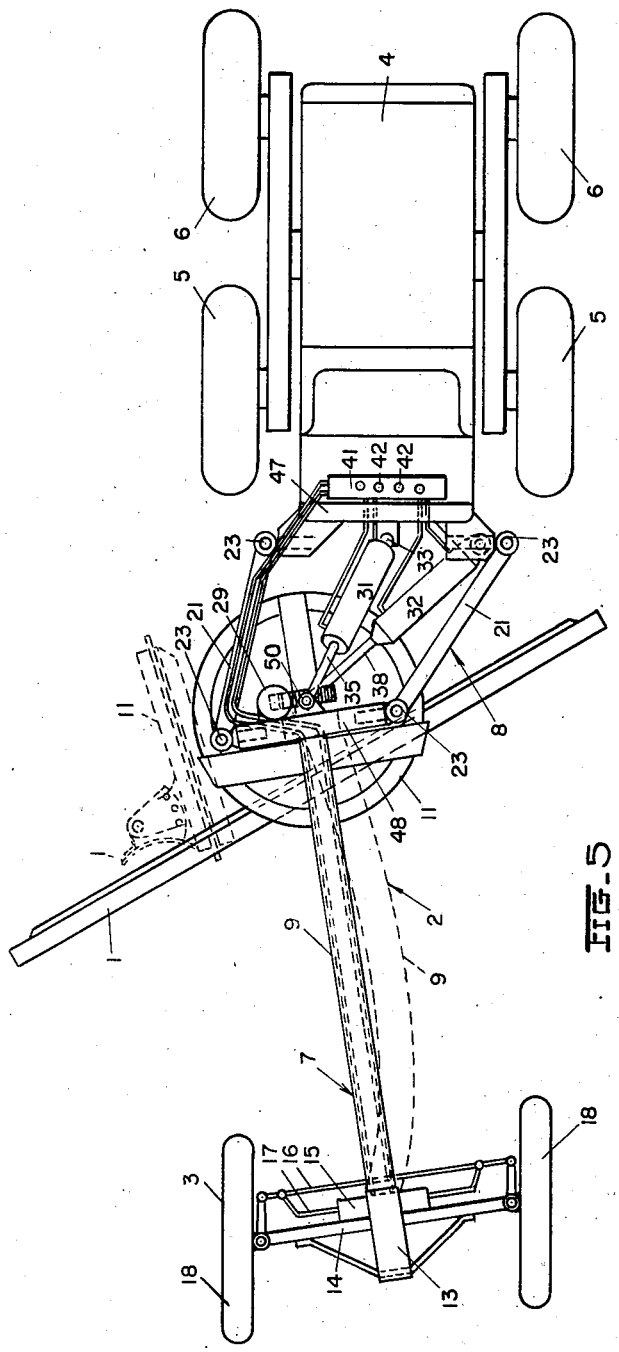

2,374,016

UNITED STATES PATENT OFFICE 2,374,016

SCRAPER

Richard F. Henneuse, Marion, Ohio

Application October 16, 1940, Serial No. 361,454

6 Claims. (Cl. 37—156)

This invention relates to a scraper, and more particularly to an improved arrangement of supporting parts for the scraper blade, by which the position of the scraper blade may be adjusted relatively to a traction device employed for imparting movement to the scraper blade during a scraping action.

The scraper of this invention is particularly adapted for use in connection with road grading work. In work of this character difficulties are frequently encountered in connection with bank sloping, ditches, and shoulder forming work. To enable a scraper to do this type of work, the scraper blade must be adjustable relatively in a lateral direction with respect to the traction device so that the traction device can ride inwardly of the edge of the road while performing work on the edge of the road, since the edge of the road is frequently too soft or weak to support the weight of the traction device. In order to establish a proper grade or surface on a bank or ditch, the scraper blade must also be movable or adjustable considerably from a horizontal position to positions in which the cutting edge of the scraper blade is angularly inclined with respect to a horizontal plane.

Most conventional scrapers make little or no provision for lateral adjustment of the scraper blade, or rotatable adjustment thereof about a horizontal axis to vary the vertical cutting angle of the scraper blade, and are, accordingly, inapplicable for work of the character referred to. Those machines which do make provision for such adjustment usually employ a rigid frame from which is suspended a sub-frame carrying the scraper blade. To adjust the position of the scraper blade, the sub-frame is moved relatively to the rigid frame. In such mechanism, the framework carrying the sub-frame provides limited space for adjustment of the scraper blade, and presents obstacles to such adjustments which hamper and make adjustment of the scraper blade a difficult operation.

One of the principal objects of this invention is to eliminate the necessity of employing an adjustable sub-frame, by the provision of a novel arrangement of supporting parts for the scraper blade.

A further object is to provide a scraper having a supporting structure carrying a scraper blade, the supporting structure being formed in two parts relatively movable to each other for securing the necessary adjustment of the blade with respect to the traction vehicle to which the supporting structure is secured.

A further object is to provide a scraper of the character referred to having a novel arrangement of mechanism for rotating the supporting structure formed of two relatively movable parts, one of which carries the scraper blade.

A further object is to provide a supporting structure for a scraper blade wherein the supporting structure is formed of two parts relatively movable to each other for the purpose of securing vertical and lateral adjustment of the scraper blade relative to the traction device, and wherein the supporting structure and the scraper blade carried thereby is rotatable for the purpose of adjusting the vertical cutting angle of such blade.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:

Fig. 1 is a side elevational view of a scraper constructed in accordance with the principles of this invention, Fig. 2 is a top plan view of the scraper shown in Figure 1, Fig. 3 is an end elevational view of the scraper shown in Figure 1, parts thereof not being shown, Fig. 4 is a side elevational view of a modified form of scraper construction, and Fig. 5 is a top plan view of the scraper construction shown in Figure 4.

Referring to the drawings, the numeral 1 indicates a scraper blade carried by a supporting structure indicated as a whole by the numeral 2, the supporting structure 2 having its forward end secured to a front wheel assembly 3, and its rearward end secured to a traction device 4. The traction device 4 may be any suitable form of power driven vehicle adapted to impart a backward and forward movement to the supporting structure 2, and the scraper blade 1 carried thereby. As shown, the traction device 4, is provided with separate pairs of wheels, 5 and 6. However, if desired, a traction device having a single pair of wheels may be employed without departing from the principles of this invention, and in such case the traction device would constitute a permanent part of the scraper construction including the supporting structure 2 and front wheel assemlby 3. The particular form of scraper construction illustrated in both modifications is adapted to be connected to any suitable type of traction device 4 as an auxiliary attachment, but it is to be understood that the supporting structure 2 and wheel assembly 3 may be permanently secured to a traction device supplied with such parts.

The supporting structure 2, is constructed of two parts, a front part 7 and a rear part 8. The front part 7, comprises a single beam member 9 having a depending part 10 rigidly secured thereto, and on the lower end of which is mounted a horizontal circle 11, to which is secured the scraper blade 1. The construction of the horizontal circle 11 is not illustrated in detail, the construction of such part being well known in the art. The horizontal circle 11, accordingly, may be of any suitable construction permitting the rotatable adjustment of the blade 1 with respect to the center of the circle structure 11 for the purpose of varying the forward cutting angle of the blade 1 in a horizontal plane. The forward end of the beam 9, is provided with a part 12 rotatably receivable in a journal 13 rigidly secured to the axle 14 of the wheel assembly 3.

A double acting fluid pressure cylinder 15 is operatively connected to the steering mechanism 16 for imparting a steering movement to the wheels 18 of the front wheel assembly 3. The cylinder 15, is mounted on the axle 14 and is adapted to actuate operating members 17 connected to the steering linkage 16, upon admission of fluid pressure thereto from lines 19 in a manner to be described.

The part 8, of the supporting structure 2, comprises a plate 20 and separate pairs of links 21 and 22, as best shown in Figs. 1 and 2. Opposite ends of the links 21 and 22 are respectively provided with suitable universal connections 23, to the plate 20 and to the terminal end 24 of the part 7, the universal connections permitting pivotal movement of such links about axes at right angles to each other. The links and universal connections 23 associated with each of the pairs of links 21 and 22 form parallelograms, lying in planes transversely of the scraper, the universal connections 23 defining the corners of each of the parallelograms. In the construction shown in Figures 1 and 2, the universal connections of each of the pairs 21 and 22 with the plate 20 and with the rearward part 24 of the beam 9 are equally spaced from each other. By this arrangement, the member 24 constituting the rear part of the front part 7 of the supporting structure 2 will be maintained parallel to the plate 20 and the axle 14 of the wheel assembly 3 will likewise be maintained parallel to the supporting plate 20.

The plate 20 is keyed or otherwise rigidly secured to a shaft 25 rotatably mounted in a supporting part 26, rigidly secured to the traction device 4. The shaft 25 has a gear 27 keyed thereto which has intermeshing relationship with a rack 28. A double acting fluid pressure cylinder 29 is provided for imparting a reciprocating movement to the rack 28. The fluid pressure cylinder is adapted to be supplied with fluid pressure from lines 30 for controlling movement of the rack 28 in a manner to be described.

Double acting fluid pressure cylinders 31 and 32 are respectively provided for imparting vertical and lateral adjustments to the position of the blade 21. The fluid pressure cylinder 31 is provided with a universal connection 33 to the plate 20 and a universal connection 34 to the upper part 24 of the beam 9 at a point intermediate the universal connections 23 at the forward end of the upper pair of links 21. In this manner the fluid pressure cylinder 31 will be operable through its piston rod 35 to impart raising and lowering movements to the rear end of the beam 9 and the blade 1 carried thereby upon admission of fluid pressure thereto through lines 36, in a manner to be described. In connection with the raising and lowering movement, it will be noted that the links 22 are shorter than the links 21. By this arrangement the links 22 will be operative to draw the blade 1 rearwardly toward the traction device 4 upon operation of the cylinder 31 to raise the blade vertically to an inoperative position. This action enables the blade 1 to be moved to an inoperative position with a smaller movement of the piston rod 35 than would be necessary if the links 22 were of the same length as the links 21.

The fluid pressure cylinder 32 is provided with a universal connection 37 to the plate 20 at a point underneath one of the universal connections 23 at the corner of the parallelogram formed by the lower pair of links 22. The piston rod 38 operated by the fluid pressure cylinders 32 is provided with a universal connection 39 to the depending member 10 at a point adjacent the horizontal circle 11, and centrally of the depending portion 10. Upon admission of fluid pressure to the cylinder 32 through lines 40, in a manner to be described, the cylinder 32 will be operative to cause the links 21 and 22 to pivotally move laterally relative to the plate 20 to adjust the lateral position of the part 7 and the blade 1 carried thereby with respect to the traction device 4. By this arrangement, the beam 9 may be moved back and forth between a position in central alignment with the traction device 4 and its position offset with respect to the traction device 4, as shown in Figure 2.

The fluid pressure lines 19, 30, 36 and 40, respectively connected to the double acting fluid pressure cylinders 15, 29, 31 and 32, are connected to separate valve mechanisms mounted in a control panel 41. The separate valve mechanisms in the control panel 41 are adapted to be selectively operated by manual control elements 42 for selectively connecting either end of the fluid pressure cylinders 15, 29, 31 and 32 with a suitable source of fluid pressure from a line 43 supplied with fluid pressure by a suitable pump 44.

The particular construction of the valve mechanism controlling the supply of fluid pressure to the various double acting cylinders forms no part per se of this invention, any suitable type of three-way valve mechanism adapted to alternately connect either end of the double acting fluid pressure cylinders to a source of fluid pressure and the other end of the cylinder to an exhaust line, and with a neutral position preventing the admission or exhaust of fluid from the cylinders being employable for the purposes of this invention.

In order that the cylinders 31 and 32 may be operated to effect the desired adjustment of the position of the scraper blade, it will be apparent that combined manipulation of the valve controlling such cylinders must be had since fluid blocked in one of the cylinders would be effective to prevent actuation of the other of said cylinders. However, as pointed out, the particular form of valve control of the cylinders forms no part per se of this invention and any suitable control for the cylinders 31 and 32 may be used without departing from the principles of this invention.

In the modification just described, it will be noted that the cylinders 31 and 32 cooperate in effecting the adjustment of the beam 9 and blade 1 carried thereby with respect to the traction device 4. To vary the grade to be cut by the scraper, it is merely necessary to operate the control 42 for the cylinder 29 to actuate the rack 28 which will, in turn, impart a rotational movement in the gear 27 and to the plate 20. Rotation of the plate 20 will impart, through the links 21 and 22, rotation to the beam 9 and the blade 1 carried thereby with respect to the front wheel assembly 3. This rotation causes the blade to be rotated about the supporting structure 2 to enable the blade 1 to cut, or operate on any desired grade. This rotation varies the angle of the scraping edge 45 of the blade 1 with respect to a horizontal plane and thereby varies the vertical cutting angle of such blade. The combination of movements effected by the various cylinders thereby enables the cutting position of the blade to be readily adjusted both laterally and vertically with respect to the traction device 4, and rotatably with respect to a horizontal plane. This construction permits rotation of the structure 2 through an angle of 90° to a position as indicated in dotted lines in Fig. 5 to permit the blade 1 to operate on a substantially vertical bank, if necessary.

In the modification just described, it will be noted that the plate 20 controls the vertical cutting angle of the blade 1 through its rotatable control of the parts of the supporting structure carrying the blade 1. The part 20 thereby corresponds to a vertical circle, similar to the horizontal circle 11, which controls the position of the blade 1 in a plane at right angles to the horizontal circle 11. In this modification, it will be noted that the part 20 or vertical circle is mounted directly on the traction device 4 and between the traction device 4 and the part 8 of the supporting structure 2.

The modification illustrated in Figures 4 and 5 is essentially the same as illustrated in Figures 1, 2 and 3 and like numerals have been employed to designate like parts. In this modification, the part 47 corresponds to the rotatable plate or vertical circle 20 of Figures 1 and 2, and is rigidly secured to the traction device 4. The outer ends of the links 21 and 22 are provided with universal connections 23 to a plate member 48 which is separate from the part 7 of supporting structure 2, instead of being integral with the part 7 as in the modification of Figures 1 and 3. In this modification, the beam 9 is keyed to a shaft 49 rotatably carried by the plate 48. The shaft 49 is provided with a gear 50 keyed thereto which meshes with an associated rack 28 operated by a cylinder 29 in the same manner as the gear 27 of Figures 1 and 2. Operation of the gear 50 will thereby be effective to cause rotation of the beam 9 and the blade 1 carried thereby with respect to all parts of the part 8 of the supporting structure 2.

In the modification of Figs. 4 and 5, the part 8 of the supporting structure 2 does not turn when the cylinder 29 is operated to rotatably adjust the vertical cutting angle of the blade 1. Operation of the cylinder 29 is effective only to rotate the beam 9 about its bearings provided in the plate 48 and member 13. The operation of the other parts is as described in connection with the modification of Figs. 1, 2 and 3.

A further difference in the modification of Figs. 4 and 5 is that the distance between the connections 23 at the forward ends of the links 21 and 22 is less than the distance between the connections 23 at the rear of such links. By reason of this difference in the distance between the connections 23, the parts 47 and 48 will not be maintained parallel at all times. Upon operation of the cylinder 32 to move the blade laterally outwardly, the inner side of the member 48 will pivotally move toward the traction device 4. This pivotal or swinging movement of the part 48 will be operative to maintain the wheel assembly 3 in central alignment with the traction device 4. However, since its position with respect to the member 48 remains fixed, the axle 14 will be swung slightly and it will be necessary to actuate the fluid pressure cylinder 15 and steering linkage to position the wheels 3 as shown in Fig. 5, to compensate for the swinging of the axle 14 if it is desired to keep the scraper traveling in a straight line.

It is believed the operation of both modifications will be apparent from the foregoing, it being merely necessary to note that the vertical and lateral adjustment of the blades is accomplished by actuation of the cylinders 31 and 32, and that rotation of the blade through either the gear 50 or the gear 27 by actuation of the cylinder 29 is effective to vary the vertical cutting angle of the blade 1. It will also be noted that the scraper construction is comparatively simple and is comprised mainly of three parts: a rear wheel assembly provided by the traction device 4, a front wheel assembly 3, and a supporting structure 2 connecting the front and rear assemblies. The adjustment of the vertical cutting angle is provided by making the part carrying the scraper blade 1 rotatable about a horizontal axis. The other adjustments necessary are readily provided by forming the supporting structure 2 of two parts, 7 and 8, having what may be termed an elbow connection with each other. By adjusting the parts 7 and 8 relative to each other, it is possible to quickly and easily adjust the vertical and lateral position of the blade 1 relative to the traction device 4.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a scraper, a rotatable supporting structure having a scraper blade carried thereby, a power driven traction vehicle having a member mounted thereon for rotation about a horizontal axis, a front wheel assembly, means mounting the forward end of said supporting structure on said wheel assembly for rotational movement about its longitudinal axis with respect thereto, supporting means for and spacing the rearward end of said supporting structure from said traction vehicle constituting the sole connection therebetween and comprising a link structure having pivotal connections with said rotatable member and said rearward end, means for moving said link structure to cause lateral movement of said rearward end and blade with respect to said traction vehicle, and means for rotating said rotatable member to impart a rotational movement to said supporting structure and the blade carried thereby to vary the vertical cutting angle of said blade.

2. In a scraper, a supporting structure having a scraper blade carried thereby; a front wheel assembly; means mounting the forward end of said supporting structure on said wheel assembly; a traction vehicle; linkage structure having universal connection with said traction vehicle and the rearward end of said supporting structure, said linkage structure and said supporting structure constituting the sole connection between said traction vehicle and said front wheel assembly; and means for universally moving said linkage structure with respect to said vehicle to effect vertical and lateral movement of said rearward end and said scraper blade with respect to said traction vehicle.

3. In a scraper, a supporting structure having a scraper blade carried thereby; a front wheel assembly; means mounting the forward end of said supporting structure on said wheel assembly; a traction vehicle; linkage structure having universal connection with said traction vehicle and the rearward end of said supporting structure, certain of said universal connections defining the four corners of a parallelogram, said linkage structure and said supporting structure constituting the sole connection between said traction vehicle and said front wheel assembly; and means for universally moving said linkage structure with respect to said vehicle to effect vertical and lateral movement of said rearward end and said scraper blade with respect to said traction vehicle.

4. In a scraper, a supporting structure having a scraper blade carried thereby; a front wheel assembly, means mounting the forward end of said supporting structure on said wheel assembly; a traction vehicle; linkage structure having universal connection with said traction vehicle and the rearward end of said supporting structure, certain of said universal connections defining the four corners of a parallelogram in a substantially horizontal plane transversely of said scraper, said linkage structure and said supporting structure constituting the sole connection between said traction vehicle and said front wheel assembly; and means for universally moving said linkage structure with respect to said vehicle to effect vertical and lateral movement of said rearward end and said scraper blade with respect to said traction vehicle.

5. In a scraper, a supporting structure having a scraper blade carried thereby; a front wheel assembly; means mounting the forward end of said supporting structure on said wheel assembly; a traction vehicle; linkage structure having universal connection with said traction vehicle and the rearward end of said supporting structure, certain of said universal connections defining the four corners of a parallelogram, a hydraulic jack so connected as to be capable of changing the shape of such parallelogram, said linkage structure, jack and said supporting structure constituting the sole connection between said traction vehicle and said front wheel assembly; and means for universally moving said linkage structure with respect to said vehicle to effect vertical and lateral movement of said rearward end and said scraper blade with respect to said traction vehicle.

6. In a scraper, a supporting structure having a scraper blade carried thereby; a front wheel assembly; means mounting the forward end of said supporting structure on said wheel assembly; a traction vehicle; linkage structure having universal connection with said traction vehicle and the rearward end of said supporting structure, certain of said universal connections defining the four corners of a parallelogram, a hydraulic jack so connected as to be capable of changing the shape of such parallelogram, a second jack so connected as to be capable of shifting vertically one side of such parallelogram, said linkage structure, jacks and said supporting structure constituting the sole connection between said traction vehicle and said front wheel assembly; and means for universally moving said linkage structure with respect to said vehicle to effect vertical and lateral movement of said rearward end and said scraper blade with respect to said traction vehicle.

RICHARD F. HENNEUSE.